April 28, 1936.  A. F. ITTNER  2,038,567
EXHAUST CONSUMER
Filed Nov. 25, 1932
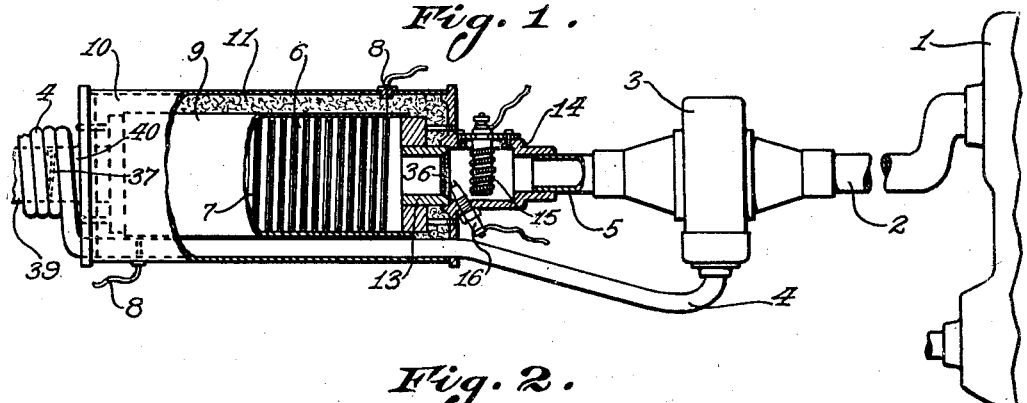
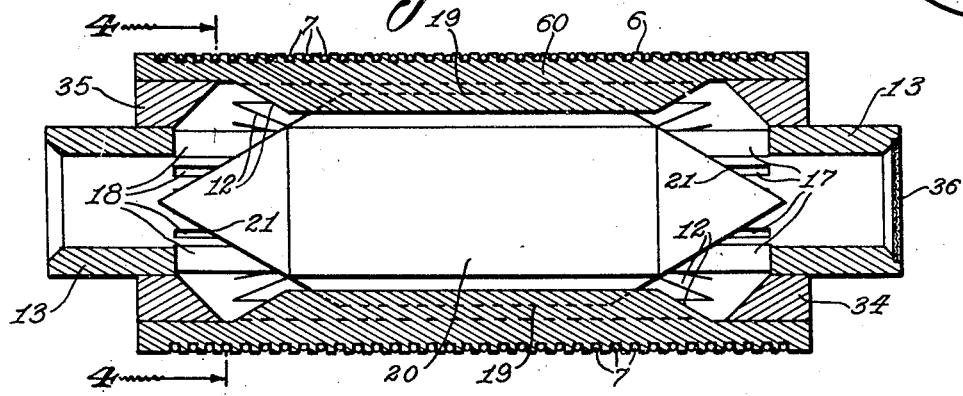
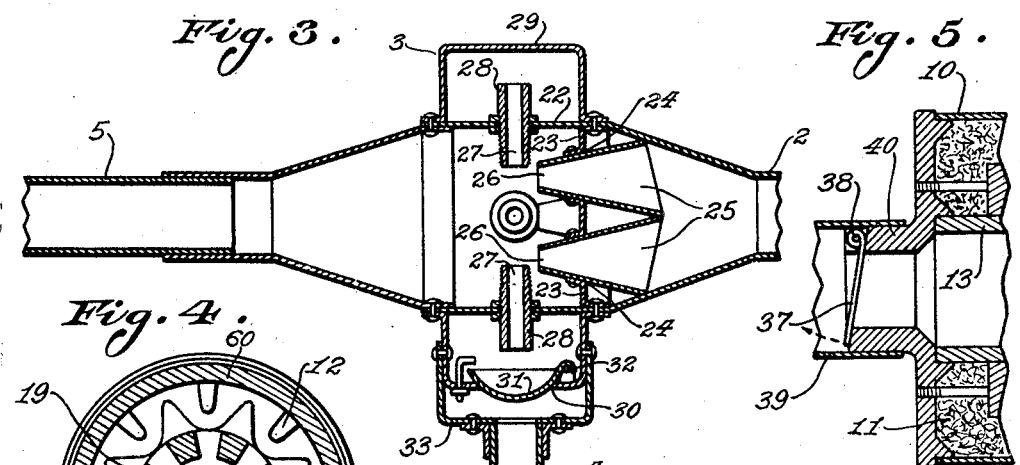
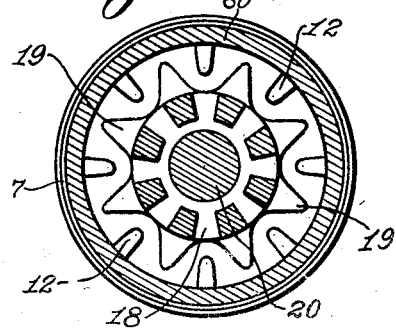
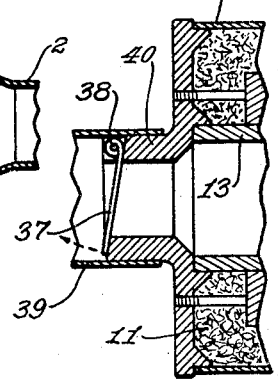
Inventor:
ANTHONY F. ITTNER,
John H. Benninga
His Attorney.

Patented Apr. 28, 1936

2,038,567

UNITED STATES PATENT OFFICE 2,038,567

EXHAUST CONSUMER

Anthony F. Ittner, St. Louis, Mo.

Application November 25, 1932, Serial No. 644,217

6 Claims. (Cl. 183—6)

This invention relates generally to the treatment of exhaust products from internal combustion engines and particularly to an apparatus wherein such products are oxidized and rendered non-toxic.

In the oxidation of carbon monoxide and other products of combustion such, for instance, as in the treatment of exhaust gases from internal combustion engines an intimate mixture of the products to be oxidized with air or oxygen is introduced into a zone the conditions of which are such as to promote oxidation. Such reaction is, however, retarded by cold, so that such devices as exhaust gas consumers, ordinarily do not operate efficiently at the start when the parts are chilled, and accordingly, such devices do not prohibit the emission of noxious gases until the parts become warmed. It is also desirable that such apparatus be so constructed and arranged that combustion once initiated and given a good start will continue without the aid of external energy so long as a fresh supply of air and exhaust gases flows into a hot zone. The present invention aims to provide an apparatus so constructed and arranged as to be suitable for consuming or oxidizing the exhaust gases from internal combustion engines, and particularly those which are employed for vehicular service. It is to be understood, however, that the exhaust consumer of the present invention is adapted for connection with internal combustion engines of the stationary type.

The object of the present invention generally stated is to provide an exhaust gas consumer compactly arranged and adapted to operate effectively upon the start of an engine.

Another object of the present invention is to provide a combustion chamber for an exhaust gas consumer so constructed and arranged that parts of the same may be readily and quickly heated to a temperature sufficient to promote combustion of exhaust gases.

A further object of the invention is to provide an exhaust gas consumer having a mixing chamber so constructed and arranged as to operate as an aspirator and supply the necessary quantity of air.

A further object of the invention is to provide a mixing chamber with air ports so controlled as to prevent escape of the exhaust gases therethrough.

A more specific object of the invention is to provide an apparatus for oxidizing exhaust gases wherein a combustion chamber may be preheated by means of an external source of energy and combustion may be initiated by means of an external source of energy but in which after a short period of operation the supply of external energy may be discontinued.

Still another object of the invention is to provide an apparatus arranged to automatically control the supply of air in accordance with the quantity of exhaust gases delivered for consumption.

Other objects will become apparent to those skilled in the art when the following description is read in connection with the accompanying drawing, in which:

Figure 1 is a view somewhat diagrammatic in form showing a conventional internal combustion engine with the exhaust gas consumer of the present invention associated with the exhaust manifold thereof.

Figure 2 is a sectional view of the combustion chamber of the exhaust consumer of the present invention.

Figure 3 is a sectional view of the mixing chamber of the present invention.

Figure 4 is a view in end elevation showing the arrangement of tubes and ribs in the combustion chamber shown in Figure 2.

Figure 5 is a view in side elevation showing the mounting of a valve for closing the combustion chamber from the outside.

In accordance with the present invention means is provided whereby the exhaust pressure of an internal combustion engine operating through a mixing chamber performs the function of as aspirator by drawing in and mixing with the exhaust gases sufficient air, preheated if desired, to completely oxidize the exhaust products. The present invention further contemplates that the combustible gaseous mixture be preliminarily preheated and then introduced into a combustion chamber which may itself have been preheated to a temperature sufficient to promote oxidation of the products. Furthermore, the combustion chamber just referred to may, in accordance with the present invention, be so constructed and arranged that the parts thereof will quickly be elevated to temperatures at which oxidation of carbon monoxide is promoted so that further energization, preheating or external ignition is unnecessary. The consumer parts are so arranged that a minimum of resistance is offered to the passage of the gases therethrough.

Referring now particularly to the drawing for an illustrative embodiment of the present invention, an internal combustion engine I has connected to its exhaust pipe 2 a mixing chamber 3 having an air inlet tube 4. In the mixing chamber 3 the exhaust gases from the motor 1 become thoroughly intermixed with a sufficient quantity of air to oxidize the same to non-toxic gases. From the mixing chamber 3 this combustible gaseous mixture may be introduced through a pipe 5 to a combustion chamber 6. Arranged at the entrance to the combustion chamber 6, as, for instance, in a separate housing 14 may be a suitable externally energized means 15 for preheating or igniting the gaseous mixture. From chamber 6 the non-toxic gases may be discharged through a pipe 39.

As shown in Figure 1, there is embedded in the exterior walls of the combustion chamber 6 a coil 7 of wire having suitable resistance to operate as a heating element when energized as by electricity. Energizing current may be supplied to the coil 7 through terminals 8. Overlying the coil 7 may be a suitable protecting shield 9. The combustion chamber 6 with the coil 8 and shield 9 may be suitably supported concentrically within a jacket 10 and preferably in spaced relation to the latter, as shown. In the embodiment illustrated in the drawing the space 11 between the jacket 10 and the shield 9 is filled with suitable insulating material but it will be understood that this space may be made use of to heat water or air which in turn may be used to heat the interior of an automobile when desired.

The air inlet tube 4 may also pass between jacket 10 and shield 9 in such relation as to preheat the incoming air, and may if desired, encircle the pipe 39 so as to absorb heat from the latter.

In Figure 2, one illustrative embodiment of the internal arrangement of the combustion chamber and its associated parts is illustrated more in detail. In the embodiment shown, the combustion chamber 6 may comprise an exterior shell 60 formed of any suitable, preferably refractory material such, for instance, as fire clay. Extending from end to end of the shell 60 is a series of ribs 12 which extend inwardly from the interior thereof and the edges of which are of relatively thin section so as to be readily heated. The opposite ends of the ribs 12 are tapered so as to reduce the resistance to the flow of gases thereacross. Concentrically mounted within the combustion chamber 6 is a tube 13 of suitable, preferably refractory, material. A metallic housing 14 adapted to accommodate a series of coils 15 adapted to be energized by any suitable source of external electric power, as for instance a storage battery or house lighting system is mounted adjacent the inlet end of tube 13. The coils 15, although primarily intended to preheat the housing 14 and the gaseous mixture which passes therethrough may also, if the same is heated to a sufficiently high temperature, be employed for igniting the gases. Furthermore when the coils are made of suitable material such as copper, chromium, platinum, etc., or alloys thereof, a beneficial catalytic effect will result. A suitable spark plug such, for instance, as 16 may be employed in lieu of the coil 15 or in addition to it for effecting ignition of the gases. Across the mouth of the tube 13 may, when desired, be mounted a wide mesh catalytic screen 36, of suitable material.

The construction just described is merely illustrative and it will be understood that beneficial results are obtainable without the use of such features as ribs 12 and 19, screen 36, and spark plug 16.

The tube 13 is provided near the end thereof adjacent the housing 14 with a series of apertures 17 extending through the wall thereof and communicating with the space between the tube 13 and the shell 60. Likewise at the opposite end of the tube 13 is a series of apertures 18 extending through the wall thereof. Intermediate the two series of apertures 17 and 18 the interior of the tube 13 is blocked by an obstruction 20, as clearly shown in Figure 2 so as to prevent the passage of gases directly therethrough. The space between the ends of the shell 60 and the outside of the tube 13 may be sealed off by a suitable wall as, for instance, bushings 34 and 35 so as to provide a closed chamber 6 on the interior of the shell 60 and at the exterior of the tube 13. With a suitable obstruction intermediate the ends of the tube 13, it is apparent that the incoming gases pass outwardly from the tube through the apertures 17 and travel along between the exterior of the tube 13 and the interior of chamber 6 and are permitted to re-enter the tube 13 through the apertures 18.

As clearly shown in Figure 4 the exterior of the tube 13 may be provided with a series of ribs 19 extending longitudinally thereof and arranged to extend between the inwardly extending ribs 12 of the combustion chamber 6. As is apparent from Figure 4, the edges of the ribs 12 and 19 present a section somewhat thinner than the other parts of the chamber and consequently may be quickly heated to a temperature sufficient to promote combustion of carbon monoxide. Likewise the ribs which separate windows 17 become quickly heated so as to promote combustion.

The obstruction 20 of the interior of tube 13 which prevents the flow of gases directly therethrough may have the ends thereof suitably stream-lined as shown at 21 so as to offer a minimum of resistance to the flow of gases therearound.

At the outlet end of tube 13 is a housing 40 in which a valve 37 is mounted to swing upon a rod 38 as shown in Figure 5. The valve 37 may be in the form of a plate of light material, such as asbestos, arranged to move to close the end of tube 13 under the action of gravity, and thus prevent cold air from entering the chamber 6 while the engine is not running. When, however, the engine is started the exhaust pressure will lift valve 37 to permit escape of gases. It will be understood of course that suitable balancing devices may be provided to render valve 37 readily responsive to exhaust pressure.

Referring now particularly to Figure 3, the mixing chamber 3 may comprise a hollow shell 22 mounted directly in the exhaust line 2 from the motor 1. At the forward end of the shell 22 is a plate 23 having a plurality of orifices 24. The plate 23, with the exception of the orifices 24 internally closes the forward end of the shell 22. Mounted in each of the orifices 24 is a funnel-like tube 25, the constricted end 26 of which terminates adjacent the mouth 27 of an air tube 28 mounted in and extending through the peripheral wall of the shell 22. It will be understood that one such tube 28 is provided for each funnel 25, there being, in the embodiment illustrated, four such tubes and funnels. Surrounding the shell 22 and enclosing the air tubes 28 is a jacket 29 having an air port 30. Suitably mounted on the interior of the jacket 29 for controlling the port 30 is a suitable valve 31 which may be of any desired construction adapted to operate in response to suction created by the flow of exhaust gases through the constricted ends 26 of the funnels 25. In the embodiment illustrated, the valve 31 is of a cupped construction mounted upon a hinge 32 which may be balanced by a suitable spring so as to be responsive to slight pressures. The provision of a valve such as 31, however, operates to prevent the issue of exhaust gases outwardly through the port 30 should resistance to the flow thereof through the remainder of the system be too great.

A chest 33 connected with air inlet tube 4 may completely enclose valve 31.

From the foregoing description the operation of the apparatus of the present invention will be understood to be as follows:—Exhaust gases from the motor 1 are delivered by the exhaust line 2 to the funnels 24, the exhaust pressure of the engine being sufficient to force the gases through the constricted ends 26 thereof at an increased velocity. This has an aspirating effect, the streams of exhaust gases directed across the mouths of the tubes 28 drawing in air from the jacket 29 and at the same time, by virtue of the position of the tubes 28 with reference to the constricted ends 26 of the funnels 25, the streams of gas and air impinge upon each other so that the same become thoroughly intermixed. The quantity of air drawn into the mixer is therefore automatically regulated in accordance with the quantity of exhaust gas. From the mixing chamber 3 the gases travel to the housing 14 and there encounter the hot coil 15, the temperature of which may be, if desired, sufficient to ignite the gaseous mixture. The gases, having been preheated by the hot wires 15 and ignited by the same or spark plug 16, pass through screen 36 and into tube 13, then through apertures 17 where complete combustion takes place, it being understood that the coil 7 may have been energized for a time sufficient to preheat the chamber 6 to such an extent that combustion, even upon initial operation of the engine is not retarded by virtue of the cold condition thereof. After operation has progressed for a short period, however, the edge of the ribs 19 and 12 in the combustion chamber will have reached a temperature sufficient to initiate combustion of the gaseous mixture. When this condition is attained, it will be understood that further energization of the coils 7 and 15 and spark plug 16 is unnecessary. After complete combustion has taken place on the interior of the combustion chamber 6, the resulting gases may be discharged through the apertures 18 and passing valve 31 be conducted away. Such apparatus may also perform the function of the ordinary muffler.

From the foregoing description it will be understood that the exhaust consumer of the present invention is not limited to the specific details of construction which have been hereinbefore, for the purpose of illustration, referred to. Furthermore, it is apparent that many modifications of the apparatus will present themselves to those skilled in the art which will not depart from the spirit of this invention and it is to be distinctly understood, therefore, that such modifications and the use of such individual features and sub-combinations of features as do not depart from the spirit of this invention are, although not specifically described herein, contemplated by and within the scope of the appended claims.

Having thus described the invention, what is claimed is:

1. A device for treating exhaust gases from an internal combustion engine, comprising a hollow shell having a plurality of funnels mounted therein, the space between said funnels and interior of the tube being sealed, and a plurality of air tubes mounted therein with their mouths disposed adjacent the constricted ends of the funnels and each arranged to direct a stream of air at substantially right angles to the stream of gas issuing from the adjacent funnels.

2. A device for treating exhaust gases from an internal combustion engine, comprising a hollow shell having a plurality of funnels mounted therein, the space between said funnels and interior of the tube being sealed, a plurality of air tubes mounted therein with their mouths disposed adjacent the constricted ends of the funnels and each arranged to direct a stream of air at substantially right angles to the stream of gas issuing from the adjacent funnels, a jacket surrounding said shell and enclosing said air tubes, said jacket having an air port, and a suction responsive valve controlling said port.

3. A gas consumer adapted to receive the exhaust gases from an internal combustion engine comprising, a combustion chamber having an outside shell, a concentrically mounted tube having a series of apertures in the walls thereof near the opposite ends thereof, an obstruction in said tube intermediate the series of apertures, and projections extending outwardly from the exterior of said tube and inwardly from the interior of the shell.

4. A combustion chamber for oxidizing products of combustion, comprising, concentrically arranged spaced tubes connected together at their ends, the smaller tube having openings through the wall thereof connecting the interior thereof with the space between the tubes, means for deflecting gas from the interior of the smaller tube through the openings, and ribs extending longitudinally of the chamber in the space between the concentric tubes.

5. A gas consumer for internal combustion engines comprising, in combination, a mixing chamber connected to receive exhaust gases from the engine, means in said mixing chamber for subdividing the stream of exhaust gases and directing them through a plurality of spaced orifices, air inlet tubes terminating adjacent each of said spaced orifices and disposed to direct a stream of air in substantially right angular relation to the stream of exhaust gases issuing from each of said spaced orifices, a combustion chamber connected to receive the mixture from said mixing chamber, means intermediate said combustion and mixing chambers for preheating the mixture, means at the entrance to said combustion chamber for igniting the mixture, and means on the interior of said combustion chamber for spreading the burning mixture into a thin substantially annular stream while the general direction of flow is maintained.

6. A device for treating exhaust gases from an internal combustion engine comprising, a mixing chamber, a plurality of constricted tubes arranged to conduct exhaust gases in to said mixing chamber, and a plurality of air inlet tubes extending radially in to the chamber and arranged with their mouths adjacent the mouths of the constricted tubes in position to have a draft of exhaust gas directed thereacross.

ANTHONY F. ITTNER.